April 14, 1964   J. M. TRONDSEN   3,128,861
POWER CONTROLLED WINCH
Filed June 23, 1960   2 Sheets-Sheet 1

INVENTOR.
JOHN M. TRONDSEN
BY
Buckhorn, Cheatham & Blore
ATTORNEYS

April 14, 1964     J. M. TRONDSEN     3,128,861
POWER CONTROLLED WINCH

Filed June 23, 1960                              2 Sheets-Sheet 2

INVENTOR.
JOHN M. TRONDSEN
BY
Buckhorn, Cheatham & Blore
ATTORNEYS

United States Patent Office 3,128,861
Patented Apr. 14, 1964

3,128,861
POWER CONTROLLED WINCH
John M. Trondsen, Portland, Oreg., assignor to Hyster Company, Portland, Oreg., a corporation of Nevada
Filed June 23, 1960, Ser. No. 38,370
8 Claims. (Cl. 192—17)

This invention relates to winches, and particularly to a power controlled cable winch.

A main object of the invention is to provide an improved power controlled winch, particularly such a winch having a single control member for effecting a number of winching operations.

A further object is to provide such a winch having fluid operated friction clutches cooled by part of the actuating fluid.

Another object is to provide a power controlled winch having means for effecting "inching" of the brake.

Various other objects of the invention will be apparent from the following description taken in connection with the accompanying drawings wherein.

General Description

Figure 1:
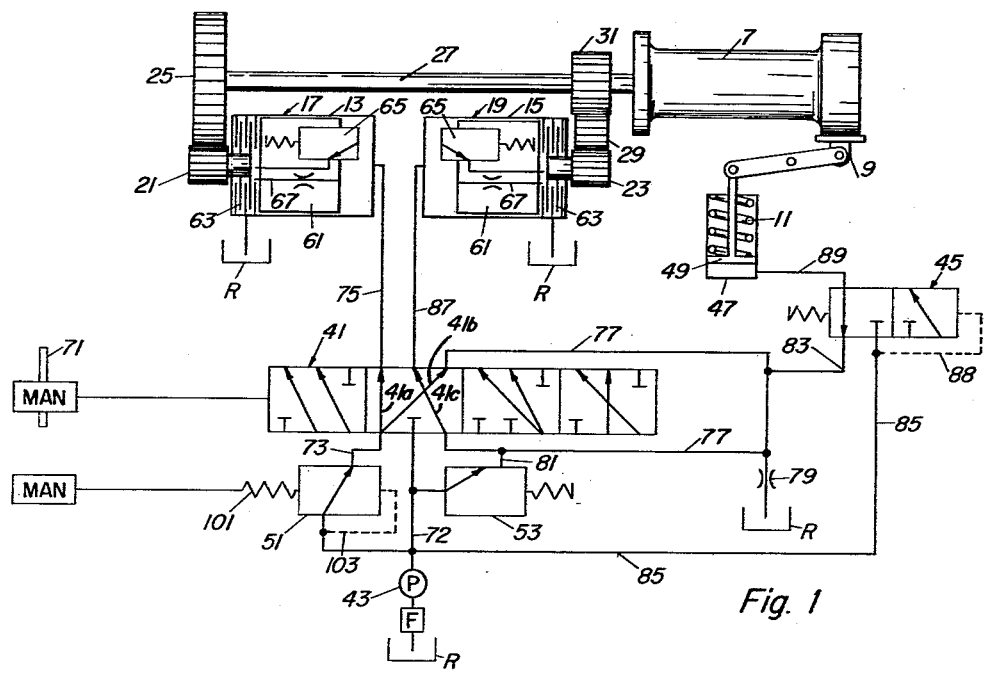
FIG. 1 is a diagrammatic view of a winch of the invention, showing the control circuit in its neutral condition.

Referring to FIG. 1, the winch includes a winch drum 7 and a brake 9 urged by a spring 11 to brake the drum. The drum is adapted to be driven by an engine, not shown, such as the engine of a crawler tractor, if the winch is mounted on the tractor. The drive is to a pair of rotary cylinders 13 and 15 which constitute parts of a pair of fluid operated friction clutches 17 and 19. When a clutch is engaged, it drivingly connects its cylinder to an associated gear, there being a gear 21 for clutch 17 and a gear 23 for clutch 19. Gear 21 meshes with a gear 25 fixed to a shaft 27, and gear 23 meshes with an idler gear 29 which in turn meshes with a gear 31 fixed to the shaft 27. The drum 7 is fixed on the shaft 27 or to a drum shaft, if a separate drum shaft is provided.

It is apparent that if clutch 17 is engaged, the drum 7 will be driven in a forward direction, that is in a direction to reel or winch in the winch cable, not shown. If instead, clutch 19 is engaged, the drum will be driven in a reverse direction, that is to reel out cable.

A power control circuit is provided to enable the clutches to be engaged or disengaged, and the brake to be rendered effective or ineffective. This circuit includes a manually operable control valve 41 to control the supply of fluid from a pump 43 to the clutches 17 and 19, and also to control the supply of fluid from the pump to a fluid pressure operated valve 45 which controls the flow of fluid to and from a brake releasing cylinder 47. The cylinder contains a piston 49 against which the spring 11 bears.

The circuit further includes a manually operable "inching" valve 51 which can also control the operation of the valve 45 by closing off the flow of fluid through the line 73 and hence cut off flow through line 77 and thereby build up an operating pressure in the line 85 to cause operation of the valve 45 and engagement of the brake at 9. Reference to FIG. 1 will show that shifting of valve 51 from the position shown will cause a build up of pressure from the pump 43 in the line 85. The circuit still further includes a pressure regulating valve 53 to limit the pressure in the system.

Detail Description

Each of the driven cylinders 13 and 15 contains a piston 61 to actuate a friction clutch pack 63 when subjected to a predetermined pressure. Each piston contains a pressure operated valve 65 to control the flow of fluid from the inner end of the cylinder to the clutch pack at the outer end, this fluid serving to cool the pack. The valve 65 actually never completely closes, and to diagrammatically indicate this, a restricted flow passage 67 is shown. Thus a supply of cooling fluid for the friction pack is assured at all times regardless of the condition of the valve 65. After passing through the pack, the oil discharges to the reservoir R.

The valve 41 is a four position valve, and a single control member or lever 71 controls the operation of the valve.

FIG. 1 shows the neutral position of the valve, which is so constructed that in such position a line 72 from the pump 43 is blocked at the valve, but fluid passing through the open valve 51 from the pump 43 passes through a line 73 to a passage 41a of the valve 41 and then through a line 75 to the cylinder 13. The line 73 is, however, also placed in communication with a line 77 by a passage 41b. The line is connected to the reservoir R by a line having a restriction 79. The restriction creates a low pressure in line 77 and provides a source of fluid at low pressure. The line 77 constitutes a passageway communicating with the reservoir R in by-passing relation with respect to the pressure regulating valve 53.

Line 77 is also connected to the valve 53 by a line 81, and to the valve 45 by a line 83. The valve 45 is also connected to the pump 43 by a line 85.

In its neutral position, the valve 41 has a passage 41c which places the line 77 in communication with a line 87 leading to the cylinder 15.

It is apparent from the above description that fluid at a low pressure is applied to the pistons 61 of the cylinders 13 and 15. This pressure is insufficient to actuate the pistons 61 or the associated valves 65, but is sufficient to supply an adequate amount of fluid to the friction packs 17 to cool the same. This low pressure is also insufficient to actuate the valve 45 (through a pilot line 88) and while the valve 45 in its FIG. 1 position does connect line 83 with a line 89 leading to the cylinder 47, the low pressure of the fluid is insufficient to actuate the piston 49. Thus the brake 9 remains engaged with the drum. The function of the pilot line 88 is to shift the valve 45 from its FIG. 1 position to its FIG. 2, 3 or 4 position when fluid under an operating pressure is present in line 85. Otherwise, the valve is in its FIG. 1 position permitting the draining of fluid from the cylinder 47 back to the reservoir.

A review of the above shows that in the neutral condition of valve 41, the drum is disengaged from the driven cylinders 13 and 15, and that the drum brake 9 is set. Also, fluid at low pressure passes through the valves 65 to cool the friction clutches.

Figure 2:
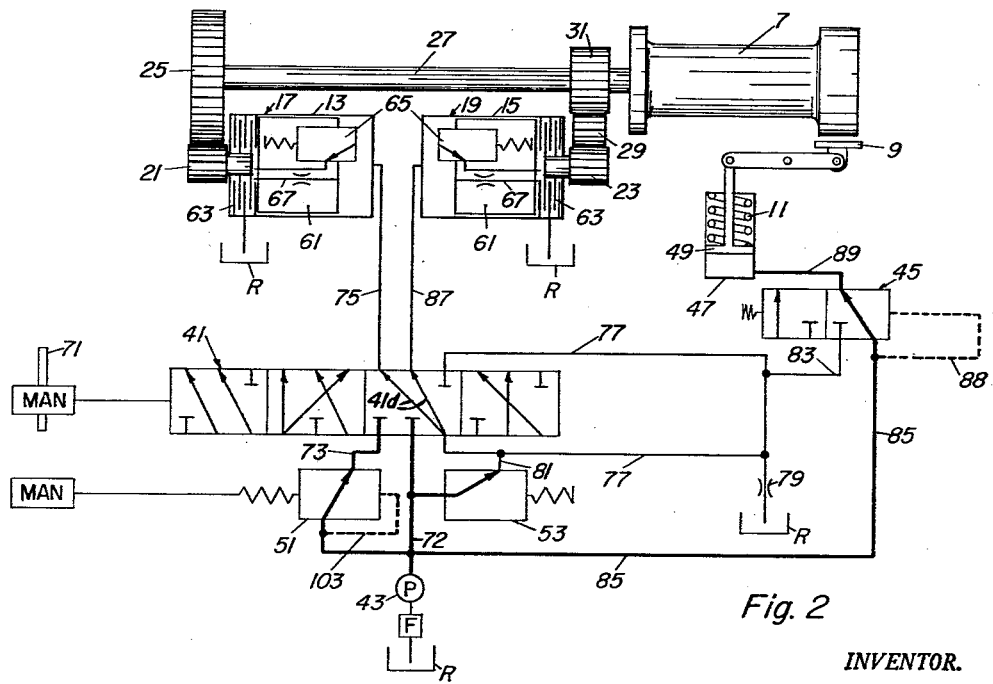
FIGS. 2, 3 and 4 are similar views, but FIG. 2 shows the circuit in its free spooling condition, FIG. 3 in its power reel out condition, and FIG. 4 in its power reel in condition.

To provide for free spooling of the drum, the lever 71 is actuated to shift the valve spool of the valve 41 to the FIG. 2 position. In such position, the lines 73 and 77 are no longer in communication so that pressure builds up in line 85 to operate the valve 45 and place line 85 in communication with line 89 to release the brake 9 to free the drum 7.

The high pressure in line 85 is not, however, effective against the clutch pistons 61 because the lines 75 and 87 are connected by passage means 41d of the valve 41 with the low pressure line 77. Thus the clutches remain disengaged with cooling fluid at low pressure flowing therethrough, and the cable may be freely spooled from the drum 7.

Figure 3:
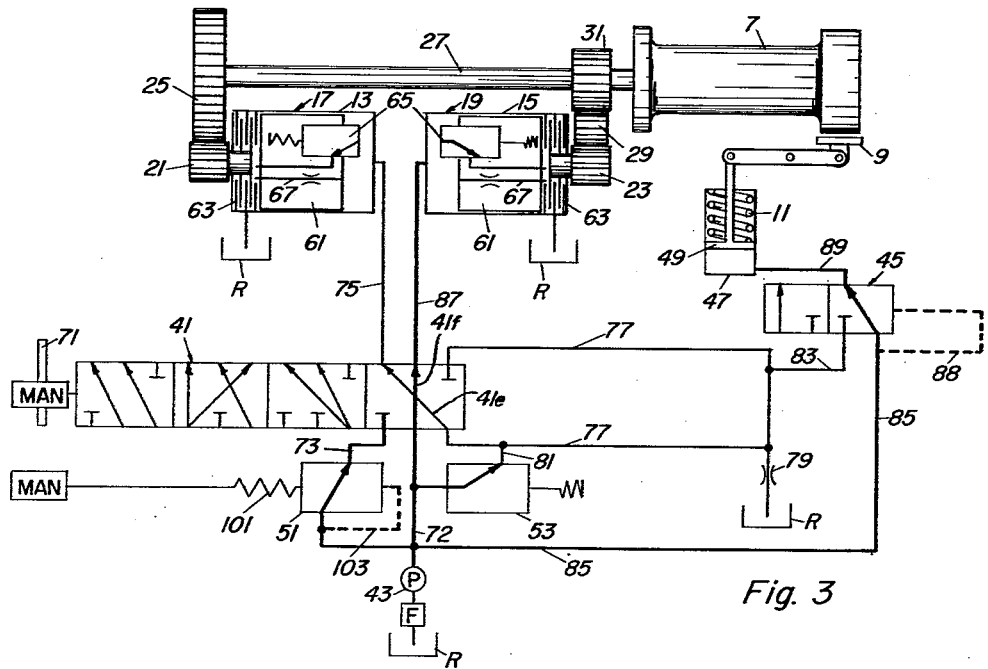

To spool out under power, the lever 71 is actuated to position the spool of the valve 41 as shown in FIG. 3.

It is evident that the line 73 remains cut off from the low pressure line 77 and thus the brake 9 is retained in its released condition. Also, a passage 41e places line 75 in communication with line 77, so that the clutch 17 remains disengaged. However, line 87 is connected to the pump by a passage 41f and thus high pressure fluid is effective against the piston 61 of the clutch 19 to engage the clutch and drive the drum to reel out cable. This high pressure "closes" the associated valve 65 to avoid loss of fluid through the valve. However, the passage 67 still allows enough fluid to pass to the pack to cool the same.

Figure 4:
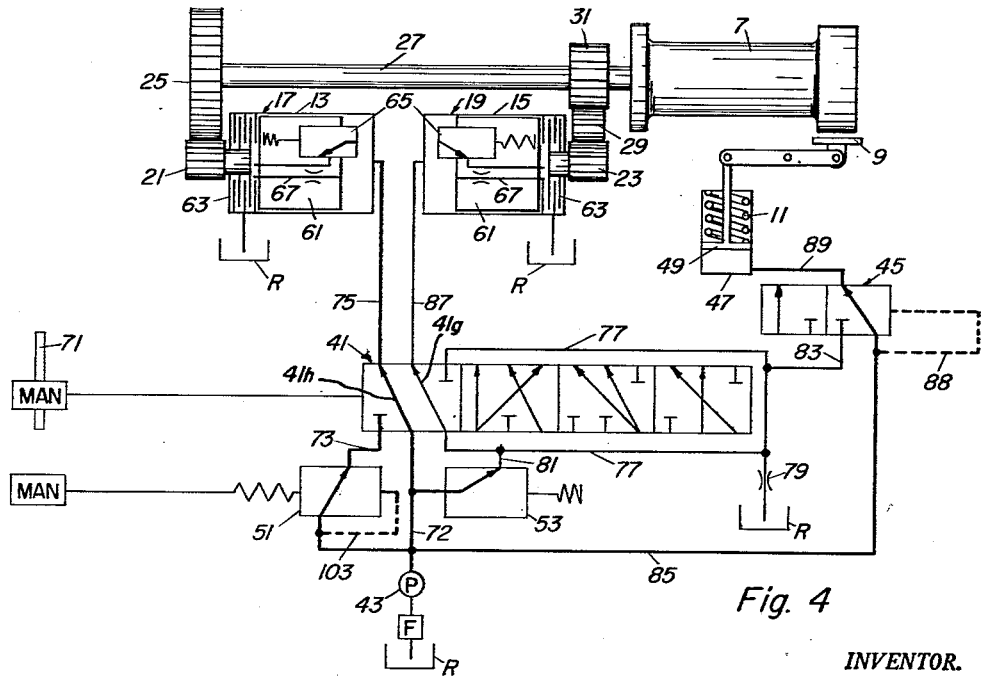

To reel in cable, the lever 71 is actuated to shift the spool of the valve 41 to its FIG. 4 position. It is evident that the brake 9 will be retained in its released condition, but now, line 87 is connected by a passage 41g to the low pressure line 77 and line 75 to the pump. Thus clutch 19 is disengaged. Clutch 17 remains engaged because of a passage 41h to drive the drum the opposite way to reel in cable.

If the valve 41 is in its FIG. 1 position, and it is desired to spool out cable slowly such as when lowering a load, the inching valve 51 is moved to a partially closed position to control the flow of fluid through the valve 51 to the low pressure line 77. By judiciously manipulating the lever, the pressure in the line 85 can be so varied as to only partially brake the drum, to let out cable at the desired rate.

To aid the operator in getting a feel of the extent of braking when inching out cable, a spring 101 is provided between the lever and the plunger of the valve 51. Also, a pilot line 103 connects the input line of the valve to the opposite end of the plunger. Thus the pressure effective against the brake is effective against the plunger of valve 51 and the operator "feels" the force applied against the spring. This assists him in controlling the rate of inching.

*Pressures in Illustrative Embodiment*

In one winch of the present invention, the following pressure valves were utilized. It has already been mentioned that the restriction 79 creates a low pressure in the line 77. In the winch under discussion this pressure was about seven pounds per square inch. The regulating valve 53 was set to give an upper pressure limit of 225 pounds per square inch, which pressure was present in line 72 anytime the line was not in communication with low pressure line 77.

The valve 45 was selected to shift at approximately forty pounds per square inch, and the brake to engage and disengage at approximately 100 pounds per square inch.

The valves 65 of the clutches were selected to close at about thirty pounds per square inch, and the clutches to start engagement at about twenty-five pounds and transmit full torque at 150 pounds per square inch.

It is apparent from the above pressure values that when the pressure was reduced to effect a declutching operation, the brake engaged prior to the clutches fully disengaging. Thus, a load on the winch cable was not dropped during a declutching operation. During a clutching operation the pressure build up was so fast that a clutch worked against the brake for only an instant.

A filter F of conventional form is shown adjacent the input of the pump 43.

Having described the invention in what is considered to be the preferred embodiment thereof, it is desired that it be understood that the invention is not to be limited other than by the provisions of the following claims.

I claim:

1. In a power controlled winch, a drum, a drive to the drum including first and second fluid actuated friction clutches, a fluid actuated brake for the drum biased to engaged position but releasable under an operating pressure, a source of fluid under pressure, and valve means for (1) simultaneously directing fluid under operating pressure to said brake and to one or the other of said clutches, or (2) for isolating said clutches and brake simultaneously from such operating pressure, or (3) for isolating only said clutches from such operating pressure.

2. In a power controlled winch, a drum, a drive to the drum including first and second fluid actuated friction clutches, a fluid actuated brake for the drum biased to engaged position but releasable under an operating pressure, a source of fluid under pressure, and valve means for (1) directing fluid under operating pressure to said brake and simultaneously to one or the other of said clutches, or (2) for isolating said clutches and brake simultaneously from such operating pressure, or (3) for directing fluid under operating pressure to said brake while isolating said clutches from such operating pressure, said valve means including a single handle for effecting the operations mentioned.

3. In a power controlled winch, a drum, a drive to the drum including first and second fluid actuated friction clutches, a fluid actuated brake for the drum biased to engaged position but releasable under an operating pressure, a source of fluid under pressure, and valve means for (1) directing fluid under operating pressure to said brake and simultaneously to one or the other of said clutches, or (2) for isolating said clutches and brake simultaneously from such operating pressure, or (3) for isolating only said clutches from such operating pressure, and other valve means for decreasing the fluid pressure applied to said brake under condition (3).

4. In a power controlled winch, a drum, a drive to the drum including first and second fluid actuated friction clutches, a fluid actuated brake for the drum biased to engaged position but releasable under an operating pressure, a source of fluid under pressure, and valve means for (1) directing fluid under operating pressure to said brake and simultaneously to one or the other of said clutches, or (2) for isolating said clutches and brake simultaneously from such operating pressure, or (3) for isolating only said clutches from such operating pressure, said valve means including a single handle for effecting the operations mentioned, and other valve means for decreasing the pressure applied to said brake under condition (3).

5. In a power controlled winch, a drum, a drive to the drum including first and second fluid actuated friction clutches, a fluid actuated brake for the drum biased to engaged position but releasable under an operating pressure, a source of fluid under pressure, and a control valve, a pressure regulating valve connected between said source and a reservoir, a passageway communicating with said reservoir in by-passing relation with respect to said pressure regulating valve, said brake being in constant communication with said source, said control valve having a first position in which fluid from said source is conducted to said passageway, a second position in which fluid from said source is connected to the high pressure side of said pressure regulating valve, a third position in which said fluid source is connected to the high pressure side of said regulating valve and to one of the fluid operated clutches, and a fourth position in which said source is connected to the high pressure side of said pressure regulating valve and to the other fluid operated clutch, there being restriction means between said passageway and said reservoir and between the low pressure side of said pressure regulating valve and said reservoir, said control valve in its first position placing said source in communication with both fluid actuated clutches to supply the same with cooling fluid at low pressure, said control valve in its first position having a through passage placing said source in communication with said one clutch and a second passage placing said source in communication with said passageway and a third passage placing said passageway in communication with said other clutch, said control valve in its second position having passage means placing said passageway in communication with both said clutches, said control valve in its third position having a passage placing said source in communication with said other clutch and another passage placing said passageway in communication with said one clutch, said control valve in its fourth position having a passage placing said source in communication with said one clutch and another passage placing said passageway in communication with said other clutch.

6. In a power controlled winch,
a drum,
a drive to the drum including first and second fluid actuated friction clutches,
a fluid actuated brake for the drum biased to engaged position but releasable under an operating pressure,
a source of fluid under operating pressure,
and a four position valve controlling the pressure of fluid from said source on said brake and clutches and having a first position in which said clutches and brake are relieved of fluid under operating pressure, a second position in which fluid under operating pressure is directed to said brake but not to said clutches, a third position in which fluid under operating pressure is directed to said brake and simultaneously to one of said clutches, and a fourth position in which fluid under operating pressure is directed to said brake and simultaneously to the other of said clutches.

7. In a power controlled winch,
a drum,
a drive to the drum including first and second fluid actuated friction clutches,
a fluid actuated brake for the drum biased to engaged position but releasable under an operating pressure,
a source of fluid under pressure,
and a control valve,
a pressure regulating valve connected between said source and a reservoir,
a passageway communicating with said reservoir in by-passing relation with respect to said pressure regulating valve so as to prevent build up of an operating pressure by said pressure regulating valve when said source is connected with said passageway, termination of such connection causing a build up of an operating pressure,
said brake being in constant communication with said source,
said control valve having a first position connecting said source and passageway, a second position terminating such connection, a third position terminating such connection and connecting said source with one clutch, and a fourth position terminating such connection and connecting said source with the other clutch.

8. In a power controlled winch,
a drum,
a drive to the drum including first and second fluid actuated friction clutches,
a fluid actuated brake for the drum biased to engaged position but releasable under an operating pressure,
a source of fluid under pressure,
and a control valve,
a pressure regulating valve connected between said source and a reservoir,
a passageway communicating with said reservoir in by-passing relation with respect to said pressure regulating valve so as to prevent build up of an operating pressure by said pressure regulating valve when said source is connected with said passageway, termination of such connection causing a build-up of an operating pressure,
said brake being in constant communication with said source,
said control valve having a first position connecting said source and passageway, a second position terminating such connection, a third position terminating such connection and connecting said source with one clutch, and a fourth position terminating said connection and connecting said source with the other clutch,
there being flow restriction means in advance of said reservoir to provide a source of fluid at a pressure less than said operating pressure,
said control valve means in its first position placing the just mentioned source in communication with both clutches to supply the same with cooling fluid.

References Cited in the file of this patent
UNITED STATES PATENTS

| | | |
|---|---|---|
| 2,136,454 | Miller | Nov. 15, 1938 |
| 2,703,162 | Keim et al. | Mar. 1, 1955 |
| 2,723,567 | Double et al. | Nov. 15, 1955 |
| 2,771,976 | Smirl | Nov. 27, 1956 |
| 2,791,918 | Frellsen | May 14, 1957 |
| 2,833,385 | Peterson et al. | May 6, 1958 |
| 2,837,192 | Dunkelow | June 3, 1958 |
| 2,838,913 | Peterson et al. | June 17, 1958 |
| 2,868,341 | Snoy | Jan. 13, 1959 |
| 2,869,701 | Yokel | Jan. 20, 1959 |
| 2,920,732 | Richards et al. | Jan. 12, 1960 |

FOREIGN PATENTS

| | | |
|---|---|---|
| 794,414 | Great Britain | May 7, 1958 |